(12) United States Patent
Lee

(10) Patent No.: US 8,565,223 B2
(45) Date of Patent: Oct. 22, 2013

(54) 1X MESSAGE PROCESSING

(75) Inventor: Anthony S. Lee, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 261 days.

(21) Appl. No.: 12/986,331

(22) Filed: Jan. 7, 2011

(65) Prior Publication Data

US 2011/0164609 A1   Jul. 7, 2011

Related U.S. Application Data

(60) Provisional application No. 61/292,861, filed on Jan. 7, 2010, provisional application No. 61/294,499, filed on Jan. 13, 2010, provisional application No. 61/295,065, filed on Jan. 14, 2010.

(51) Int. Cl.
  *H04L 12/66* (2006.01)
(52) U.S. Cl.
  USPC .......................................................... 370/352
(58) Field of Classification Search
  USPC .......................................................... 370/352
  See application file for complete search history.

(56) References Cited

U.S. PATENT DOCUMENTS

| | | | |
|---|---|---|---|
| 2006/0182069 A1* | 8/2006 | Yu | 370/335 |
| 2007/0097924 A1* | 5/2007 | Martinovich et al. | 370/332 |
| 2007/0280264 A1* | 12/2007 | Milton et al. | 370/395.31 |
| 2010/0317378 A1* | 12/2010 | Fang et al. | 455/466 |

\* cited by examiner

*Primary Examiner* — Luat Phung
*Assistant Examiner* — Najeebuddin Ansari
(74) *Attorney, Agent, or Firm* — Richard K. Huffman; James W. Huffman

(57) ABSTRACT

An apparatus for notifying of a circuit switched event over a packetized data network. The apparatus includes a packetized data modem and an internetworking interface. The packetized data modem is configured to transmit and receive packetized data over a packetized data radio link. The packetized data modem has a tunneling link access control processor that is configured to encapsulate/decapsulate data for a subset of sub-layers corresponding to a link access control layer of a circuit switched network model. The internetwork interface is operatively coupled to the packetized data modem via the packetized data network, and is configured to notify the packetized data modem of the circuit switched event. The internetworking interface has a link access control/tunneling link access control processor that is configured to encapsulate/decapsulate the data when performing notification of the circuit switched event.

17 Claims, 4 Drawing Sheets

PRESENT DAY DUAL MODE CELLULAR ARCHITECTURE

IMPROVED DUAL MODE TUNNELING REFERENCE MODEL

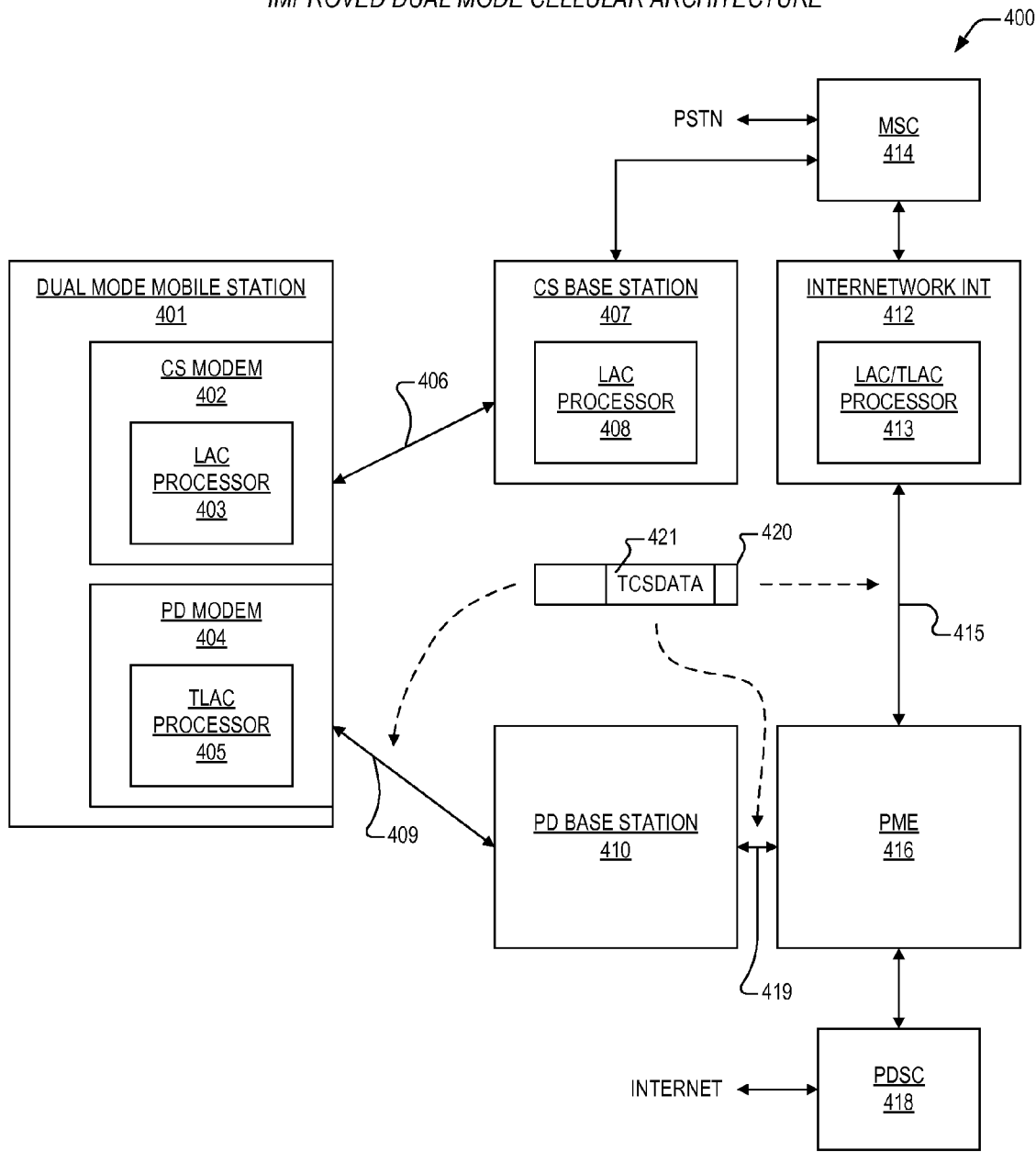

US 8,565,223 B2

1X MESSAGE PROCESSING

CROSS-REFERENCE TO RELATED APPLICATIONS

This application claims the benefit of the following U.S. Provisional Applications, each of which is herein incorporated by reference for all intents and purposes.

| Ser. No. | FILING DATE | TITLE |
|---|---|---|
| 61/292,861 | Jan. 07, 2010 | 1X MESSAGE PROCESSING |
| 61/294,499 | Jan. 13, 2010 | SIGNALING ENHANCEMENT PROTOCOL |
| 61/295,065 | Jan. 14, 2010 | TUNNELING MAC |

BACKGROUND OF THE INVENTION

1. Field of the Invention

This invention relates in general to the field of cellular communications, and more particularly to an apparatus and method for reducing the time and overhead associated with notifying a mobile station of an incoming call over a packetized data radio link.

2. Description of the Related Art

The cell phone industry is undergoing exponential growth, not only in this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service. As such, so-called circuit switched voice links have been fielded that guarantee this quality of service.

And although wireless cellular network technologies have continued to provide improvements related to the ability to process voice calls, there has also been an enormous pull on the industry to provide for the reliable and efficient transfer of packetized data. As a result, the incremental developments in high speed packetized data networks have not always tracked with the development of voice networks. It is a goal within the industry to field a more unified solution that would provide both reliable voice and high speed data access, however, the industry is not at that point presently. Consequently, it is common practice to field a mobile system that provides for voice communications over one type of circuit switched network, say CDMA2000 1xRTT, and high speed data communications over another type of network, say LTE, which provides exclusively for packetized data and does not provide the quality of service that users prefer to support voice communications. In the near future, these hybrid solutions will be prevalent within the art.

In order to field such a hybrid system, designers are forced to develop protocols for those instances where two or more co-fielded networks create conflict, or where two or more co-fielded networks are required to interoperate.

This application deals with one such instance, that is, the switching between a high speed data network that provides exclusively for packetized data communications over to a circuit switched voice network in order to process and incoming or outgoing call or other circuit switched event.

Presently, protocols exist for fallback to a circuit switched network during a high speed data session in order to process an incoming or outgoing call. Most present day techniques follow a form of "tunneling," where notification data associated with the call is encapsulated into a sequence of data units that are exchanged over the packetized data network. But the current provisions merely encapsulate all the layered data that would normally be included when notifying a mobile station of the call over the circuit switched link, including provisions related to timing and radio environment which are exclusive to the circuit switched link.

In addition to the latencies that are incurred associated with processing this non-essential data, hardware within the mobile station that is used to normally process packetized data is forced to replicate all of the layered processes and actions that otherwise be needed over the circuit switched link. Such replication, while perhaps benign from the standpoint of the notifying side, is onerous when viewed in terms of the impact seen by the mobile station, not only in terms of waste of time and processing resources, but also in terms of battery life.

Accordingly, what is needed is a technique that would eliminate or substantially reduce the latencies experienced by a cellular communications system due to notifying a mobile station of an incoming circuit switched call over a packetized data link.

In addition, what is needed is an apparatus an method that eliminates replication of unnecessary circuit switched protocol layers when notifying a mobile station of a call over a packetized data link.

SUMMARY OF THE INVENTION

The present invention, among other applications, is directed to solving the above-noted problems and addresses other problems, disadvantages, and limitations of the prior art. The present invention provides a superior technique for notifying a dual mode mobile station of a call or other circuit switched event over a packetized data radio link. In one embodiment, an apparatus for notifying of a circuit switched event over a packetized data network. The apparatus includes a packetized data modem and an internetworking interface. The packetized data modem is configured to transmit and receive packetized data over a packetized data radio link. The packetized data modem has a tunneling link access control processor that is configured to encapsulate/decapsulate data for a subset of sub-layers corresponding to a link access control layer of a circuit switched network model. The internetwork interface is operatively coupled to the packetized data modem via the packetized data network, and is configured to notify the packetized data modem of the circuit switched event. The internetworking interface has a link access control/tunneling link access control processor that is configured to encapsulate/decapsulate the data when performing notification of the circuit switched event.

One aspect of the present invention contemplates an apparatus for notifying of a circuit switched event over a packetized data network. The apparatus includes a dual mode mobile station that has a circuit switched modem and a packetized data modem. The circuit switched modem is configured to transmit and receive circuit switched data over a circuit switched radio link. The packetized data modem is configured to transmit and receive packetized data over a packetized data radio link. The packetized data modem has a tunneling link access control processor that is configured to encapsulate/decapsulate data for a subset of sub-layers corresponding to a link access control layer of a circuit switched network model.

Another aspect of the present invention comprehends a method for notifying of a circuit switched event over a packetized data network. The method includes: within an internetworking interface coupling a circuit switched network to a packetized data network, encapsulating data for a subset of sub-layers associated with a link access control layer of a circuit switched network model; transmitting the data over the packetized data network; and via a packetized data modem, receiving the data over a packetized data radio link within the packetized data network, and decapsulating the data according to the subset of the sub-layers.

BRIEF DESCRIPTION OF THE DRAWINGS

These and other objects, features, and advantages of the present invention will become better understood with regard to the following description, and accompanying drawings where:

FIG. 4 is a block diagram showing a cellular architecture according to the present invention for notifying a dual mode mobile station of an incoming call or other circuit switched event over a packetized data radio link.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

In view of the above background discussion on present day dual mode cellular architectures and associated techniques employed to notify a mobile station of a call over a packetized data radio link, a discussion of the limitations of these cellular architectures will be discussed with reference to FIGS. 1-2. Following this, a discussion of the present invention will be provided with reference to FIGS. 3-4. The present invention overcomes present day limitations and disadvantages by providing a tunneling architecture, apparatus, and method whereby unnecessary processing is eliminated throughout a packetized data network.

Figure 1:
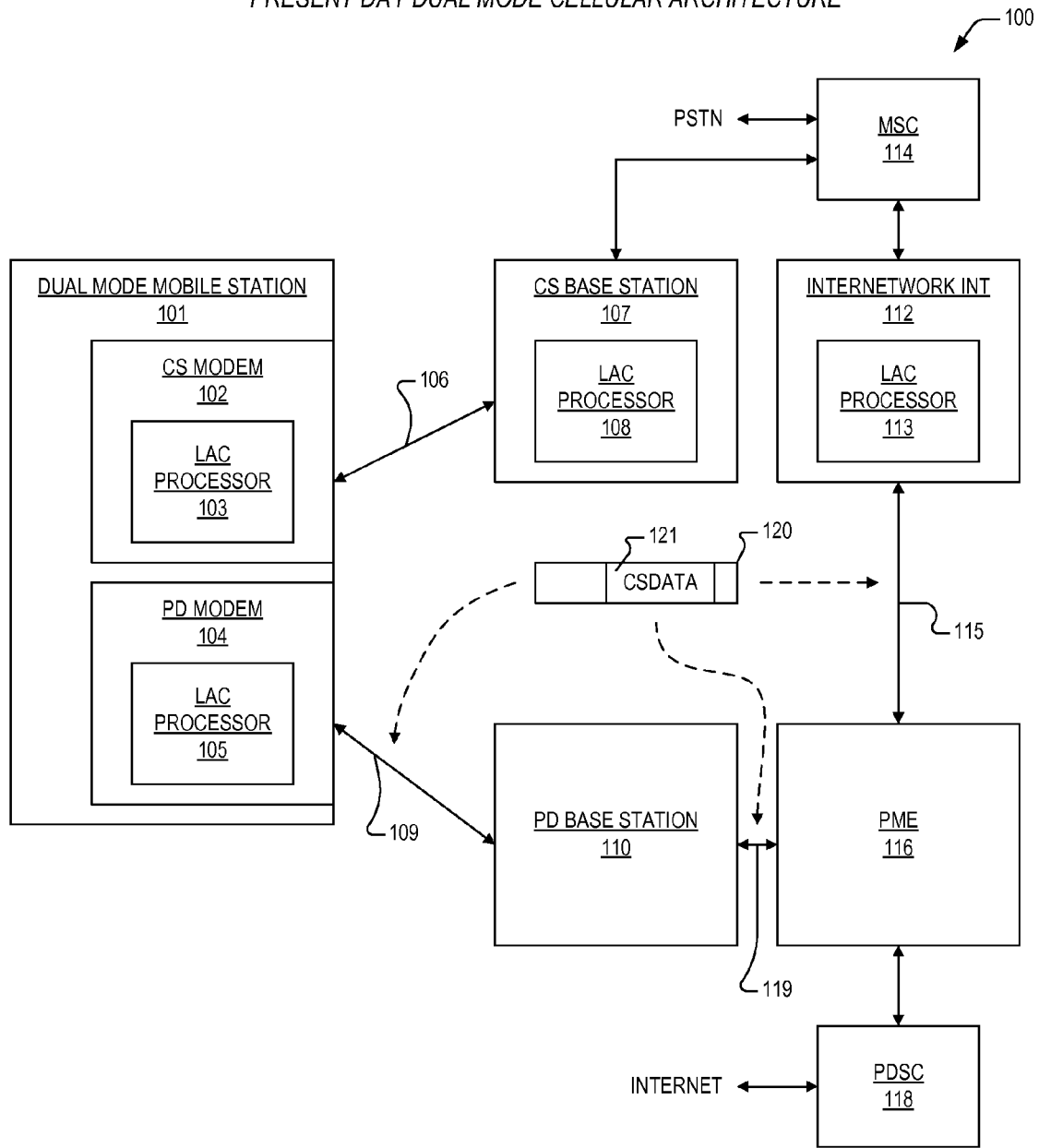
FIG. 1 is a block diagram illustrating a present day cellular architecture for notifying a dual mode mobile station of an incoming call or other circuit switched event over a packetized data radio link.

Consider FIG. 1, where a block diagram is presented diagram illustrating a present day cellular architecture 100 for notifying a dual mode mobile station 101 of an incoming call or other circuit switched event over a packetized data radio link 109. The architecture 100 includes the mobile station 101, which has a circuit switched modem 102 for processing circuit switched cellular applications, and a packetized data modem 104, for processing packetized data applications. The mobile station 101 is coupled to a circuit switched base station 107 via a circuit switched radio link 106 and to a packetized data base station 110 over the packetized data radio link 109.

The circuit switched base station 107 is coupled to a mobile switching center 114. The mobile switching center 114 is coupled to an internetworking interface 112. The internetworking interface 112 is coupled to a packetized management entity (PME) 116 via a packetized data link 115. The mobile switching center 114 routes calls and events to/from a public switched telephone network (PSTN). The packetized management entity 116 is coupled to a packetized data switching center 118, which routes data and events to/from a packetized data network such as the internet.

In operation, circuit switched calls and events over the PSTN are routed by the mobile switching center 114 to the circuit switched base station 107. All control and traffic associated with the calls or other events occurs over the circuit switched radio link 106 is processed by the circuit switched modem 102 within the mobile station 101. Likewise, packetized data and events over the internet are routed by the packetized data switching center 118 to a particular packetized data mobility entity 116 that is interfaced to the packetized base station 110 currently assigned to the mobile station 101. All control and traffic associated with the packetized data or other events occurs over the packetized data radio link 109 is processed by the packetized data modem 104 within the mobile station 101.

Of particular interest to the present application are scenarios and circumstances associated with certain present day dual mode configurations, one example of which is a dual mode mobile station 101 that is capable of processing circuit switched calls and other events over a code demand multiple access (CDMA) radio link 106 such as might be found in a CDMA2000 1xRTT architecture, and that processes packetized data and other events over a packetized data radio link 109 such as might be found in a Long Term Evolution (LTE) architecture. As one skilled in the art will appreciate, the CDMA2000 1xRTT circuit switched architecture (or "1x" architecture) is well known in the art for processing circuit switched calls ("voice calls"), and the LTE architecture is well known and is presently being fielded in major metropolitan centers around the world as an improvement in packetized data communications capabilities over the currently fielded EV-DO packetized data network. Additionally well known to those in the art is that LTE is a network exclusive to packetized data. That is, LTE does not support circuit switched events such as conventional cellular voice calls. LTE does provide support for so-called voice over internet protocol (VoIP) calls, but as one skilled in the art will appreciate, the disadvantages associated with present day VoIP techniques (e.g., jitter) make normal use of VoIP in a mobile station highly unlikely from a human factors perspective.

Going forward in the present application, examples and terminology will be employed from both 1x and LTE applications because these are well appreciated and prevalently fielded technologies that can be effectively employed to teach present day limitations and how the present invention is utilized to overcome these limitations, however, the present inventor notes that the scope of the present invention is not to be restricted to 1x and LTE, but rather extended to comprehend dual mode cellular architectures where one of the radio links 109 employed must be utilized to notify the mobile station 101 of an incoming voice call or other event that is associated with a circuit switched link 106 having timing and quality of service properties and requirements unique to circuit switched applications.

In specific 1x and LTE terminologies, the packetized data mobility entity 116 is referred to as a mobility management entity (MME), which is the primary access node for an LTE network. The MME interfaces to many packetized data base stations 110, which are known as eNBs. The internetworking interface 112 is known as an interworking solution (IWS) and is responsible for interfacing a circuit switched network such as 1x to the LTE network. Hence, when packetized data is being transmitted over the packetized data network to the mobile station, for purposes of the present application, the circuit switched elements 102, 107, 112 shown in the architecture 100 are effectively idle. Packetized data is being routed to/from the internet via the packetized data switching center 118, through the packetized data mobility entity 116, through the packetized data base station 110, and over the packetized data radio link 109 to/from the packetized data modem 104 within the mobile station.

But when a timely circuit switched event (e.g., a call) comes into the mobile switching center 114 that is targeted for the mobile station 101, the mobile station must be notified—over the packetized data radio link 109—that it must, in a timely fashion, cease processing packetized data and fall back to a circuit switched radio link 106 in order to proceed further, that is, to accept the call. Yet, because circuit switched and packetized data protocols are not equivalent, designers are working to provide techniques and mechanisms that allow for this notification to take place. One such mechanism that is employed in the 1x/LTE environment is tunneling, whereby circuit switched data (CSDATA) 121 providing for notification, acknowledgement, and negotiation of circuit switched parameters associated with acceptance of a call and fallback to a circuit switched radio link 106 are encapsulated as the data portion within higher level data packets 120 that are transmitted/received over the packetized data network, which includes links 115, 119, and 109. Hence, as the name implies, circuit switched notification data 121 employs a data packet as a tunnel through which circuit switched parameters are transmitted/received.

The internetwork interface 112 performs the interface between the mobile switching center 114 and the packetized data mobility entity 116, and is responsible for most of the processing associated with tunneling the circuit switched data 121. Tunneling packets 120 are routed through the mobility entity 116 and the base station 110 over the links 115, 119, 109, but processing of the data 121 is only required at the endpoints 101, 112. As regards present day circuit switched networks such as 1x, there is a great deal of networking information such as addressing, authentication, segmentation and reassembly, radio parameters, etc., which must be processed by the endpoints of a circuit switched event in order to guarantee quality of service. In 1x, the protocol layer at with this information is processed is known as the link access control (LAC) layer. Hence, a LAC layer processor 103 to perform these operations for circuit switched events is depicted within the circuit switched modem 102. Likewise a LAC processor 108 for performing substantially similar layered processing is depicted within the circuit switched base station 107. As one skilled in the art will appreciate, were circuit switched events the only events that were processed by the mobile station 101, then the aforementioned elements 103, 108 would suffice, for processing that the LAC layer is required.

And the packetized data modem 104 and packetized data base station 110 also include commensurate processing elements (not shown) to support layered communications over the packetized data network. However, in order to provide for notification of circuit switched calls and other events over the packetized data network, LAC layer processing elements 105, 113 are required in both the internetwork interface 112 and the packetized data modem 104. Certainly, since the primary purpose of the internetwork interface 112 is to interface the circuit switched network to the packetized data network, it follows then that processing of LAC layer information is necessary, but limiting nonetheless. Yet, inclusion of a LAC processor 105 within the packetized data modem 104 in the mobile station is even more problematic because of the limited availability of processing resources and power within the mobile station 101.

At a broad level, packetized data applications such as Internet browsing, text messaging, and file transfers rely heavily on dynamic routing of segmented messages over a network. That is, messages are broken into segments and packets and are routed to a destination (e.g., the mobile station 101) over various routes. Consequently, packets may arrive at the destination out of order, or in error, and must be retransmitted and reassembled by apparatus in the destination element. This is the very reason that present day VoIP techniques do not lend themselves favorably toward use—packet delivery cannot be guaranteed at time intervals commensurate with favored use. On the other hand, the timing requirements to favor use in a file transfer, say, are much less demanding. As an example, LTE is very fast for data transfer purposes, but cannot guarantee the timing necessary to support voice activity.

Voice calls, in contrast, demand consistent and dedicated end-to-end quality of service in order to favor use. And circuit switched protocols such as 1x, for example, provide the necessary constraints and checks to ensure high quality of service. As one skilled in the art will appreciate, this quality of service is primarily achieved via dedicated links 106, which may carry no significant information for long periods of time, but which are nevertheless available.

As one skilled in the art will further appreciate, the hardware and software associated with processing circuit switched calls and events and processing packetized data and events is necessarily different. Hence, the dual mode mobile station 101 is depicted as having both a circuit switched modem 102 and a packetized data modem 104. One skilled will further appreciate that design constraints on a present day mobile station such as processing capability and battery life often restrict the mobile station 101 such that it may process events over only one of the two links 106, 109. This application considers the problems associated with notifying the mobile station 101 of an incoming call or other circuit switched event when the mobile station 101 is actively processing packetized data over the packetized data link 109. These and other complexities associated with LAC layer processing will now be presented in more detail with reference to FIG. 2.

Figure 2:
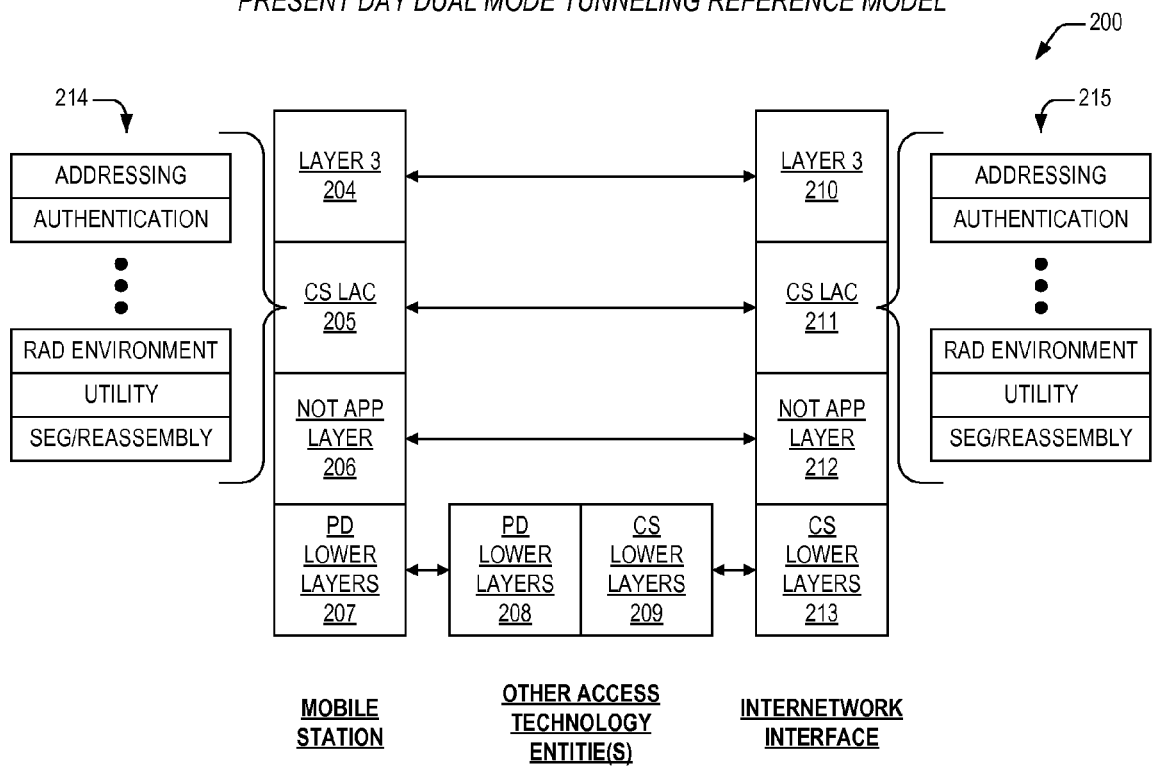
FIG. 2 is a block diagram depicting a present day dual mode tunneling reference model, such as is used to notify the dual mode mobile station of FIG. 1.

FIG. 2 is a block diagram 200 depicting a present day dual mode tunneling reference model, such as is used to notify the dual mode mobile station of FIG. 1. The diagram 200 shows how an internetwork interface communicates with a dual mode mobile station though various other access technology entities, to affect notification of a circuit switched call or other event over a packetized data network, including a packetized data radio link, as has been discussed above with reference to FIG. 1. As in any layered architecture model, each endpoint must replicate each of the network model layers. Hence, the internetwork interface receives notification of the circuit switched event from the mobile switching center according to a circuit switched layered protocol such as 1x, which includes a highest level, layer 3 210, comprising the notification information itself. Layer 3 data is encapsulated into a data unit corresponding to a circuit switched link access control layer 211, which is in turn encapsulated into a data unit associated with a notification application layer 212, which is finally encapsulated into data units corresponding to circuit switched lower layers 213, generally media access layer and physical layer. In a 1x/LTE notification configuration, the notification access layer 212 is often referred to as the general circuit services notification application (GCSNA) layer.

Lower layer data units are communicated over one or more lower layer links the other access technology entities, which replicate lower layers 208-209 commensurate with the radio technologies employed. In general, the internetwork interface communicates to a circuit switched lower layer 209 and the mobile station communicates over its packetized data radio link to a packetized data lower layer 208. As noted above, the internetwork interface notifies the mobile station over its packetized data radio link of the circuit switched event by tunneling the notification. This encapsulation of circuit switched notification data is performed at layer 3 210 and is transmitted to the mobile station over the packetized data radio link and intervening links.

The other access technology entities affect lower layer translation from circuit switched to packetized data links and thus the notification is received by the mobile station via packetized data at packetized data lower layers 207. Since this is handled by the packetized data modem within the mobile station, not additional processing or resources are required over that required for receipt and transmission of normal packetized data. However, the packetized data modem within the mobile station must also provide processing for each of the corresponding layers 210-212 in the internetworking interface. Hence, the packetized data modem within the mobile station must provide, for circuit switched notification purposes only, processing resources for a notification application layer 206, a circuit switched LAC layer 205, and a layer 3 204.

Specifically regarding the circuit switched LAC layers 205, 211, one skilled in the art will appreciate that for most circuit switched protocols, including 1x, there are a number of sub-layers 214, 215 that must be provided for. These layers include addressing sub-layer, authentication sub-layer, radio environment sub-layer, utility sub-layer, and segmentation and reassembly sub-layer. And while it is arguable that in the internetworking interface these sub-layers 215 might be required, the present inventor has noted that a significant amount of non-essential processing must be allocated and affected by the packetized data modem in the mobile station, simply to satisfy circuit switched LAC layer 205, 211 protocol requirements. For example, because packetized data units are orders of magnitude larger than circuit switched data units, no segmentation and reassembly is required. Yet, this sub-layer processing must be provided for within the packetized data modem in the mobile station. Likewise, there is no radio environment information to be passed in a radio environment sub-layer, because such is information unique to a circuit switched radio link, and the notification information is being tunneled via a packetized data network.

Accordingly, the present inventor has observed that the only layers that are essential to circuit switched event notification via a packetized data network is that data resident in the top two sub-layers: addressing and authentication. Yet, in a present day configuration, such as a 1x/LTE dual mode configuration, valuable time and processing resources are being wasted by processing "dummy" or "null" information in a tunneled notification scenario. And as one skilled in the art will appreciate, it is desirable to reduce the time and resources required to perform switches between circuit switched and packetized data networks, particularly in the case of incoming calls where user attention is typically directed.

Consequently, the present invention is provided to overcome these extraneous processing and timing limitations by providing a technique whereby all non-essential sub-layer processing and associated latencies are eliminated from the LAC layers 205, 211 in both the internetworking interface, and more importantly, the packetized data modem within the mobile station. The present invention will now be discussed with reference to FIGS. 3-4.

Figure 3:
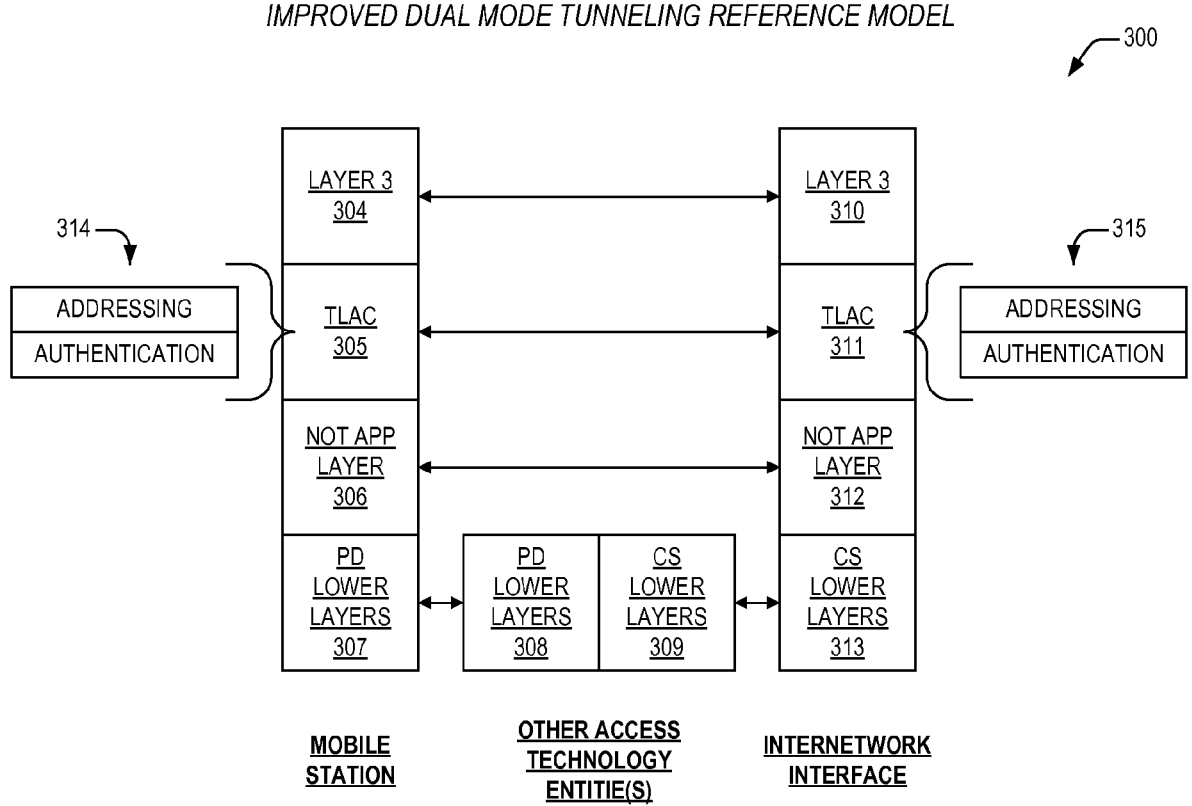
FIG. 3 is a block diagram featuring an improved dual mode tunneling reference model according to the present invention.

Turning now to FIG. 3, a block diagram 300 is presented featuring an improved dual mode tunneling reference model according to the present invention. The diagram 300 shows how an internetwork interface according to the present invention communicates with a dual mode mobile station according to the present invention though various other access technology entities, to affect notification of a circuit switched call or other event over a packetized data network, including a packetized data radio link, as has been discussed above with reference to FIG. 1. As in the diagram 200 shown in FIG. 2, each endpoint (internetworking interface and mobile station) replicate each of the network model layers. Hence, the internetwork interface receives notification of the circuit switched event from the mobile switching center according to a circuit switched layered protocol such as 1x, which includes a highest level, layer 3 310, comprising the notification information itself. Layer 3 data is encapsulated into a data unit corresponding to a circuit switched tunneling link access control layer 311 according to the present invention, which is in turn encapsulated into a data unit associated with a notification application layer 312, which is finally encapsulated into data units corresponding to circuit switched lower layers 313, generally media access layer and physical layer. In a 1x/LTE notification configuration, the notification access layer 312 is often referred to as the general circuit services notification application (GCSNA) layer.

Lower layer data units are communicated over one or more lower layer links the other access technology entities, which replicate lower layers 308-309 commensurate with the radio technologies employed. In general, the internetwork interface communicates to a circuit switched lower layer 309 and the mobile station communicates over its packetized data radio link to a packetized data lower layer 308. As noted above, the internetwork interface notifies the mobile station over its packetized data radio link of the circuit switched event by tunneling the notification. This encapsulation of circuit switched notification data is performed at layer 3 310 and is transmitted to the mobile station over the packetized data radio link and intervening links.

The other access technology entities affect lower layer translation from circuit switched to packetized data links and thus the notification is received by the mobile station via packetized data at packetized data lower layers 307. Since this is handled by the packetized data modem within the mobile station, not additional processing or resources are required over that required for receipt and transmission of normal packetized data. As in the diagram 200 of FIG. 2, a packetized data modem within the mobile station according to the present invention provides processing for each of the corresponding layers 310-312 in the internetworking interface. Hence, the packetized data modem according to the present invention within the mobile station provide, for circuit switched notification purposes, processing resources for a notification application layer 306, a circuit switched tunneling LAC layer 305, and a layer 3 304.

Specifically regarding the circuit switched tunneling LAC layers 305, 311, the present invention provides exclusively for sub-layers 314-315 that are essential to notification, that is, an addressing sub-layer and an authentication sub-layer; all non-essential processing requirements are eliminated. In one embodiment, a notification application layer 312 in the internetworking interface and a notification application layer 306 in the mobile station will employ a GCSNA layer message to exchange encapsulated notification data. In a CDMA2000 1x embodiment, these encapsulated data is sent as follows:

A transmitter (internetworking interface or mobile station) emulates all of the lower layer primitives which are required including MAC-Data.Indication, MAC-Data.Request. Necessary information is extracted from a LAC protocol data unit (PDU) and a tunneling LAC PDU is formed. The tunneling LAC PDU is then delivered to the GCSNA layer.

A receiver receives the tunneling LAC PDU form its corresponding GCSNA layer and extracts the required LAC fields. A LAC PDU is formed and delivered to processing resources provided to process the notification data.

This tunneling protocol for circuit switched notification is utilized in a 1x/LTE configuration, in one embodiment utilizing an r-csch logical channel, by providing an L3 PDU having the following fields: message type (e.g., registration, origination), length, addressing fields, authentication fields, and padding fields. In an embodiment utilizing an r-dsch logical channel, an L3 DU is encapsulated having the following fields: message type (e.g., order, authentication challenge response), length, addressing fields, encryption fields, and padding fields. In a further embodiment utilizing an f-csch logical channel, an L3 PDU is encapsulated having the following fields: message type (e.g. general page, data burst), length, addressing fields, encryption fields, padding fields. In yet another embodiment utilizing an f-dsch logical channel, an L3 PDU is encapsulated having the following fields: message type (e.g., universal handoff direction, data burst), length, addressing fields, encryption fields, and padding fields.

Accordingly, by providing an improved tunneling LAC layer 305, 311 according to the present invention, a notification layer 306, 312, such as the GCSNA layer in a 1x/LTE embodiment, requires only those resources and timing needed to tunnel the essential data, and not that required to access unnecessary 1x radio parameters, thus precluding the necessity to provide for fields relating to radio environment, segmentation and reassembly, etc.

Referring now to FIG. 4, a block diagram is presented showing a cellular architecture 400 according to the present invention for notifying a dual mode mobile station 401 of an incoming call or other circuit switched event over a packetized data radio link 409. The architecture 400 includes the mobile station 401 according to the present invention, which has a circuit switched modem 402 for processing circuit switched cellular applications, and a packetized data modem 404, for processing packetized data applications. The mobile station 401 is coupled to a circuit switched base station 407 via a circuit switched radio link 406 and to a packetized data base station 410 over the packetized data radio link 409.

The circuit switched base station 407 is coupled to a mobile switching center 414. The mobile switching center 414 is coupled to a circuit switched base station 407 according to the present invention. An internetworking interface 412 is coupled to the mobile switching center 414 and to a packetized management entity 416 via a packetized data link 415. The mobile switching center 414 routes calls and events to/from a public switched telephone network (PSTN). The packetized management entity 416 is coupled to a packetized data switching center 418, which routes data and events to/from a packetized data network such as the internet.

In operation, circuit switched calls and events over the PSTN are routed by the mobile switching center 414 to the circuit switched base station 407. All control and traffic associated with the calls or other events occurs over the circuit switched radio link 406 and is processed by the circuit switched modem 402 within the mobile station 401. Likewise, packetized data and events over the internet are routed by the packetized data switching center 418 to a particular packetized data mobility entity 416 that is interfaced to the packetized base station 410 currently assigned to the mobile station 401. All control and traffic associated with the packetized data or other events occurs over the packetized data radio link 409 and is processed by the packetized data modem 404 within the mobile station 401. Operation of elements in the diagram 400 is substantially similar to operation of like-named elements within the diagram 100 of FIG. 1. Of exception is that the packetized data modem 404 according to the present invention includes a tunneling LAC processor 405 that is configured to process TLAC layer data as is described above with reference to FIG. 3. The TLAC layer processor 405 processes addressing and authentication data in a tunneled TLAC PDU, but does not require timing or processing resources to process unnecessary and unessential sub-layer information corresponding to a circuit switched link, as in a 1x link.

In addition, the internetworking interface 412 includes a LAC/TLAC processor 413 that provides for all sub-layer processing (as shown in FIG. 2) when communicating with a circuit switched base station 407, and that provides for processing of addressing and authentication data associated with a TLAC PDU when communicating with a packetized data mobility entity 416 for purposes of tunneling circuit switched event notification.

Consequently, processing and timing associated with unnecessary circuit switched sub-layers in the LAC layer is eliminated and in a 1x/LTE embodiment GCSNA messaging and layering need provide only for notification.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. An apparatus for notifying of a circuit switched event over a packetized data network, the apparatus comprising:
   a first tunneling link access control processor, configured to receive notification of the circuit switched event and to encapsulate or decapsulate data for a subset of sub-layers corresponding to a link access control layer of a circuit switched network modem, wherein the subset of sub-layers consists only of an addressing sub-layer and an authentication sub-layer;

an internetwork interface, operatively coupled to a packetized data modem via the packetized data network, configured to notify said packetized data modem of the circuit switched event, and to transmit encapsulated or decapsulated data for the subset of sub-layers corresponding to the link access control layer, wherein the packetized data modem comprises:

a second tunneling link access control processor, configured to handle notification of the circuit switched event and to decapsulate or encapsulate the data for the subset of sub-layers corresponding to the link access control layer; and wherein the data for the subset of sub-layers corresponding to the link access control layer is generated by a circuit switch network according to the circuit switched event.

2. The apparatus as recited in claim 1, wherein the packetized data modem and the circuit switched modem are disposed within a dual mode mobile station, and wherein the circuit switched modem comprises a modem compatible with CDMA2000 1xRTT protocol and the packetized data modem comprises a modem compatible with LTE protocol.

3. The apparatus as recited in claim 1, wherein the subset of sub-layers are compatible with CDMA2000 1xRTT protocol.

4. The apparatus as recited in claim 1, wherein the data for the subset of sub-layers corresponding to the link access control layer comprises at least one of the following:
a message type field;
a length field;
addressing fields; and
authentication fields.

5. The apparatus as recited in claim 1, wherein the data for the subset of sub-layers corresponding to the link access control layer is encapsulated in a protocol data unit associated with a circuit switched transmission over one or more of the following logical channels:
r-csch channel;
r-dsch channel;
f-csch channel; and
f-dsch channel.

6. The apparatus as recited in claim 1, wherein the internetwork interface receives notification of the circuit switched event from mobile switching center according to a circuit switched layered protocol, and wherein the mobile switching center is connected to the circuit switched modem through a circuit switched network base station.

7. An apparatus for providing notification of a circuit switched event over a packetized data network, the apparatus coupled to a circuit switched network and a packetized data network, the apparatus comprising:

a circuit switched modem, configured to transmit and receive circuit switched data over the circuit switched network;

a packetized data modem, configured to transmit and receive packetized data over the packetized data network, the packetized data modem comprising:

a first tunneling link access control processor, configured to provide the notification of the circuit switched event and to encapsulate or decapsulate data for a subset of sub-layers corresponding to a link access control layer of the circuit switched network modem, wherein the subset of sub-layers consists only of an addressing sub-layer and an authentication sub-layer; and wherein the apparatus is coupled to an interwork interface through the packetized data network, and wherein the interwork interface is configured to provide notification of the circuit switched event to the packetized data modem, and wherein the apparatus is configured to transmit the encapsulated or decapsulated data for the subset of sub-layers corresponding to the link access control layer, and wherein the internetwork interface is further coupled to a second tunneling link access control processor, and wherein the second tunneling link access control processor is configured to receive the notification of the circuit switched event and to decapsulate or encapsulate the data for the subset of sub-layers corresponding to the link access control layer.

8. The apparatus as recited in claim 7, wherein the data for a subset of sub-layers corresponding to the link access control layer is generated by the circuit switched network according to the circuit switched event, wherein the internetwork interface receives notification of the circuit switched event from a mobile switching center according to a circuit switched layered protocol, and wherein said mobile switching center is connected to the circuit switched modem through a circuit switched network base station.

9. The apparatus as recited in claim 7, wherein the circuit switched modem comprises a modem compatible with CDMA2000 1xRTT protocol, and wherein the packetized data modem comprises a modem compatible with LTE protocol.

10. The apparatus as recited in claim 7, wherein the subset of sub-layers is compatible with CDMA2000 1xRTT protocol.

11. The apparatus as recited in claim 7, wherein the data for the subset of sub-layers comprises at least one of the following:
a message type field;
a length field;
addressing fields; and
authentication fields.

12. The apparatus as recited in claim 7, wherein the data for the subset of sub-layers is encapsulated in a protocol data unit associated with a circuit switched transmission over one or more of the following logical channels:
r-csch channel;
r-dsch channel;
f-csch channel; and
f-dsch channel.

13. A method for providing notification of a circuit switched event over a packetized data network, the method comprising:

encapsulating data for a subset of sub-layers associated with a link access control layer of a circuit switched network modem, wherein the subset of sub-layers consists only of an addressing sub-layer and an authentication sub-layer;

within an internetworking interface coupled to a packetized data modem, transmitting the data over a packetized data network;

via the packetized data modem, receiving the data over a packetized data radio link within the packetized data network, and decapsulating the data according to the subset of the sub-layers, wherein the packetized data modem comprises:

a first tunneling link access control processor, configured to provide the notification of the circuit switched event and to encapsulate or decapsulate data for a subset of sub-layers corresponding to a link access control layer of the circuit switched network modem, wherein the subset of sub-layers consists only of an addressing sub-layer and an authentication sub-layer; and a second tunneling link access control processor, configured to handle the notification of the circuit switched event and to decapsulate or encapsulate the data for the subset of sub-layers corresponding to the link access control layer.

14. The method as recited in claim 13, wherein the packetized data modem and the circuit switched modem are disposed within a dual mode mobile station, wherein the switched modem comprises a modem compatible with CDMA2000 1xRTT protocol, and wherein the packetized data modem comprises a modem compatible with LTE protocol.

15. The method as recited in claim 13, wherein the subset of sub-layers is compatible with CDMA2000 1xRTT protocol.

16. The method as recited in claim 13, wherein the data for the subset of sub-layers corresponding to the link access control layer comprises at least one of the following:
a message type field;
a length field;
addressing fields; and
authentication fields.

17. The method as recited in claim 13, wherein the data for the subset of sub-layers corresponding to the link access control layer is encapsulated in a protocol data unit associated with a circuit switched transmission over one or more of the following logical channels:
r-csch channel;
r-dsch channel;
f-csch channel; and
f-dsch channel.

* * * * *